(12) United States Patent
Naito et al.

(10) Patent No.: US 11,659,280 B2
(45) Date of Patent: May 23, 2023

(54) IMAGE PICKUP APPARATUS, CONTROL METHOD, AND STORAGE MEDIUM FOR CONTROLLING AN IMAGE STABILIZATION UNIT

(71) Applicant: CANON KABUSHIKI KAISHA, Tokyo (JP)

(72) Inventors: Go Naito, Kanagawa (JP); Masafumi Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/214,466

(22) Filed: Mar. 26, 2021

(65) Prior Publication Data
US 2021/0306566 A1    Sep. 30, 2021

(30) Foreign Application Priority Data
Mar. 31, 2020    (JP) .............................. JP2020-061810

(51) Int. Cl.
*H04N 23/68*    (2023.01)
*G02B 27/64*    (2006.01)

(52) U.S. Cl.
CPC ......... *H04N 23/687* (2023.01); *G02B 27/646* (2013.01); *H04N 23/683* (2023.01)

(58) Field of Classification Search
CPC .......... H04N 5/23287; H04N 5/23267; H04N 23/687; H04N 23/683; G02B 27/646
See application file for complete search history.

(56) References Cited

U.S. PATENT DOCUMENTS

| | | | |
|---|---|---|---|
| 2005/0140793 A1* | 6/2005 | Kojima | .............. H04N 5/23287 348/208.99 |
| 2019/0230288 A1* | 7/2019 | Tsuchiya | ............ H04N 5/23287 |

FOREIGN PATENT DOCUMENTS

JP    2007-058160 A    3/2007

* cited by examiner

*Primary Examiner* — Nicholas G Giles
(74) *Attorney, Agent, or Firm* — Cowan, Liebowitz & Latman, P.C.

(57) ABSTRACT

An image pickup apparatus is mountable with a lens apparatus including a first optical image stabilizing unit configured to move an optical element that is a part of the imaging optical system, in a direction intersecting an optical axis of the imaging optical system. The image pickup apparatus includes an image sensor, a second optical image stabilizing unit configured to move the image sensor in a direction intersecting the optical axis, and a control unit configured to control the second optical image stabilizing unit based on an image stabilizing reference position of the first optical image stabilizing unit which is a reference position for an image stabilization of the first optical image stabilizing unit.

15 Claims, 4 Drawing Sheets

IMAGE PICKUP APPARATUS, CONTROL METHOD, AND STORAGE MEDIUM FOR CONTROLLING AN IMAGE STABILIZATION UNIT

BACKGROUND OF THE INVENTION

Field of the Invention

The present invention relates to an image pickup apparatus that provides an image stabilization during imaging.

Description of the Related Art

One conventionally known method cooperatively controls an image stabilizer (or image stabilizing unit) that drives an optical element constituting a part of an imaging optical system for the image stabilization and an image stabilizer that drives an image sensor for the image stabilization. In the general image stabilization, a driving amount of the image stabilizer is calculated by multiplying a shake amount (corresponding to an angular variation amount) of the image pickup apparatus obtained by an inertial sensor, such as a gyro sensor, by a coefficient for converting it into a moving amount (image plane moving amount) on an imaging plane. Here, a focal length is effectively used for the coefficient for the conversion into the moving amount on the image plane when an object can be considered to be located at infinity.

On the other hand, for a finitely distant object, it is known that a parallel movement shake is mixed depending on a rotation center of a shake input to the image pickup apparatus. Usually, as disclosed in Japanese Patent Laid-Open No. 2007-58160, an image stabilizing amount can be considered to be a sum of a rotational shake at a front principal point and a parallel movement shake where the front principal point is considered to be a reference position (image stabilizing reference position) of an applied shake for the image stabilization control.

In an image pickup apparatus that provides an image stabilizer to each of a camera body and a lens barrel, the image stabilizing reference position may be different between the camera-body image stabilizer and the lens-barrel image stabilizer. For example, it is generally easy for the camera-body image stabilizer to set the image stabilizing reference position to the front principal point by selecting an imaging optical system used for an inspection.

On the other hand, the image stabilizing reference position may not be the front principal point for the lens-barrel image stabilizer, when the lens barrel is large and heavy, or when it is difficult to set the front principal point to the rotation center during the inspection. Then, w % ben the lens-barrel image stabilizer having the image stabilizing reference position that is not the front principal point and the camera-body image stabilizer having the image stabilizing reference position that is the front principal point are cooperatively controlled, the accurate image stabilization may not be available.

SUMMARY OF THE INVENTION

The present invention provides an image pickup apparatus, a control method, and a storage medium, each of which can restrain image stabilizing performance from lowering during cooperative control of an image stabilizer in a lens barrel and an image stabilizer in a camera body.

An image pickup apparatus according to one aspect of the present invention is mountable with a lens apparatus including a first optical image stabilizing unit configured to move an optical element that is a part of the imaging optical system, in a direction intersecting an optical axis of the imaging optical system. The image pickup apparatus includes an image sensor, a second optical image stabilizing unit configured to move the image sensor in a direction intersecting the optical axis, and a control unit configured to control the second optical image stabilizing unit based on an image stabilizing reference position of the first optical image stabilizing unit which is a reference position for an image stabilization of the first optical image stabilizing unit. At least one processor or circuit is configured to perform a function of at least one of the units.

An image pickup apparatus according to one aspect of the present invention is mountable with each of a lens apparatus that includes a first optical image stabilizing unit configured to move an optical element that is a part of the imaging optical system, in a direction intersecting an optical axis of the imaging optical system, and a lens apparatus that does not include the first optical image stabilizing unit. The image pickup apparatus includes an image sensor, a second optical image stabilizing unit configured to move the image sensor in a direction intersecting the optical axis of the imaging optical system, a control unit configured to control the second optical image stabilizing unit, and an acquiring unit configured to acquire information on whether or not the lens apparatus includes the first optical image stabilizing unit by communicating with the lens apparatus. The control unit changes an image stabilizing reference position of the second optical image stabilizing unit which is a reference position for an image stabilization of the second optical image stabilizing unit, between when the lens apparatus includes the first optical image stabilizing unit and when the lens apparatus does not include the first optical image stabilizing unit.

A control method corresponding to the above image pickup apparatus, and a storage medium storing this control method also constitutes another aspect of the present invention.

Further features of the present invention will become apparent from the following description of exemplary embodiments with reference to the attached drawings.

DESCRIPTION OF THE EMBODIMENTS

Figure 1A:
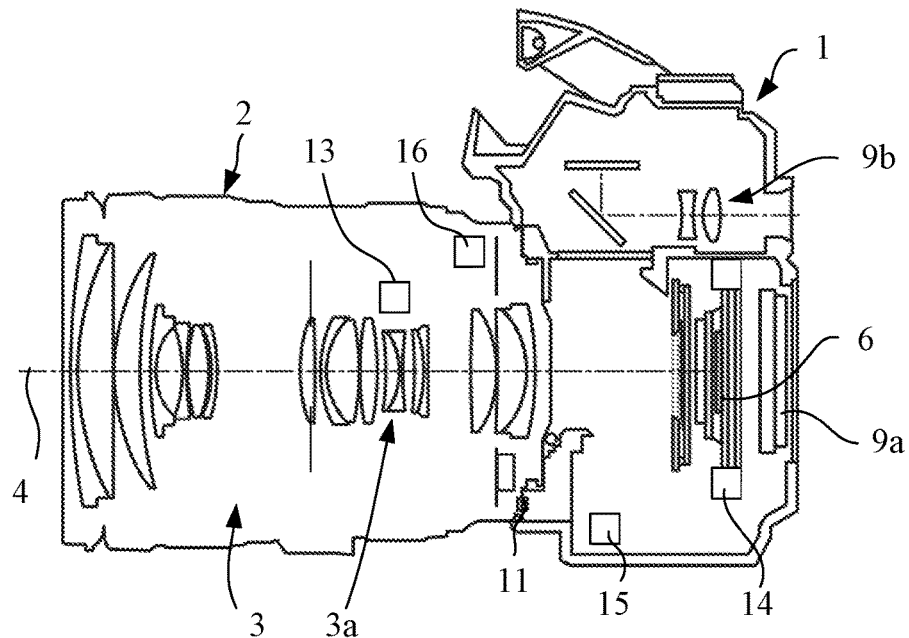
FIGS. 1A and 1B are a central sectional view and a block diagram of an image pickup apparatus according to this embodiment.
Figure 1B:
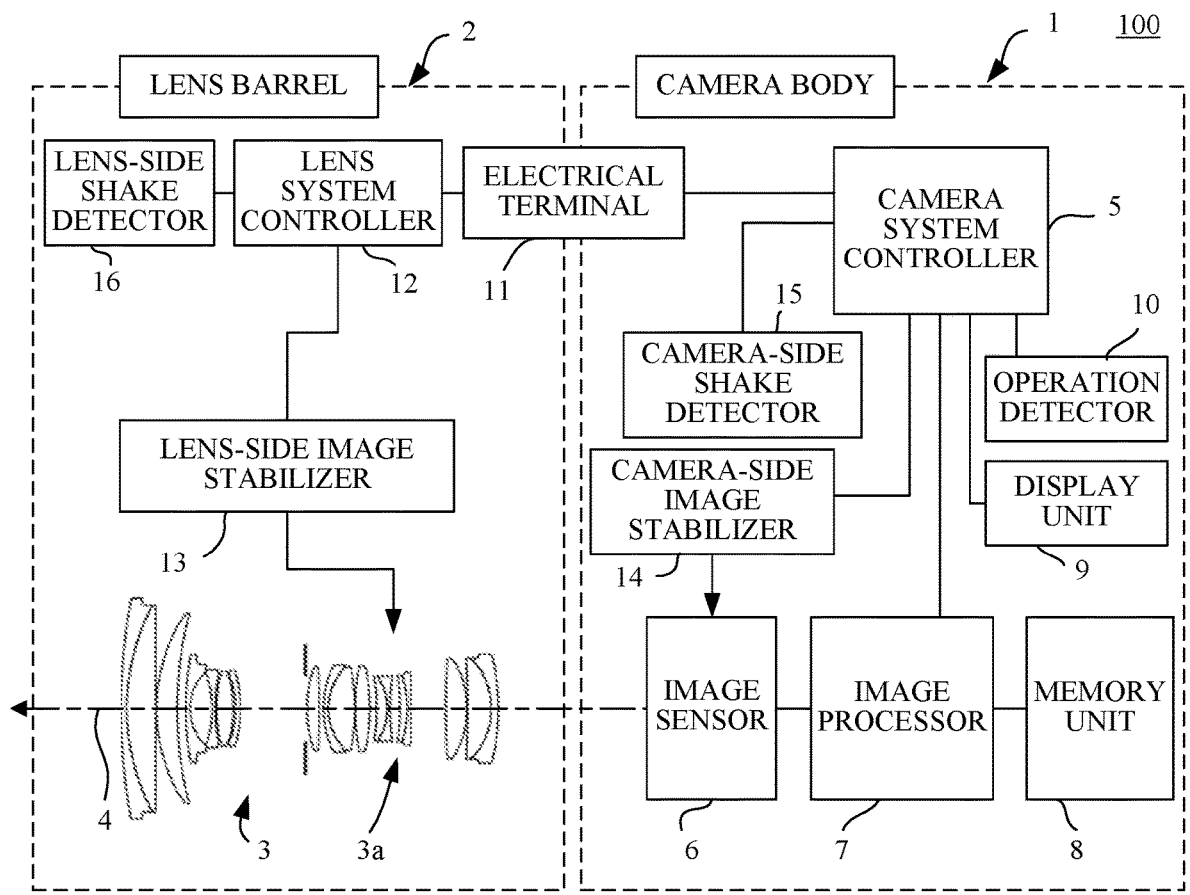

Referring now to the accompanying drawings, a detailed description will be given of embodiments according to the present invention.
Explanation of Image Pickup Apparatus
Referring now to FIGS. 1A and 1B, a description will be given of an image pickup apparatus according to this embodiment. FIG. 1A is a central sectional view of an image pickup apparatus 100 according to this embodiment, and FIG. 1B is a block diagram showing an electrical configuration of the image pickup apparatus 100. In FIGS. 1A and 1B, the same elements will be designated by the same reference numerals.

The image pickup apparatus 100 includes a camera body (image pickup apparatus body) 1, and a lens barrel (lens apparatus) 2 that is attachable to and detachable from the camera body 1. Reference numeral 3 denotes an imaging optical system provided to the lens barrel 2, which includes a plurality of lenses (or a plurality of lens units). Reference numeral 3a denotes an image stabilizing lens (optical element or lens unit) configured to provide the image stabilization, which is a part of the imaging optical system 3. Reference numeral 4 denotes an optical axis of the imaging optical system 3.

Reference numeral 5 denotes a camera system controller (camera system control unit) that controls each component in the camera body 1. Reference numeral 6 denotes an image sensor, such as a CMOS sensor or a CCD sensor, which photoelectrically converts an optical image (object image) formed by the imaging optical system 3. Reference numeral 7 denotes an image processor, reference numeral 8 denotes a memory unit, and reference numeral 9 denotes a display unit. Reference numeral 9a denotes a rear display unit provided on a rear surface of the camera body 1, and reference numeral 9b denotes an EVF (electronic viewfinder) provided in the viewfinder of the camera body 1. In this embodiment, the display unit 9 has the rear display unit 9a and the EVF 9b. Reference numeral 10 denotes an operation detector that detects a signal from an operation unit including an unillustrated shutter release button.

Reference numeral 11 denotes an electrical contact (communicator or communication unit) provided to enable a communication between the camera body 1 and the lens barrel 2. Reference numeral 12 denotes a lens system controller (lens system control unit, first controller) provided to the lens barrel 2. Reference numeral 13 denotes a lens-side image stabilizer (first optical image stabilizer or first optical image stabilizing unit) that drives the image stabilizing lens 3a for correcting the camera shake in a plane orthogonal to the optical axis 4 (in the direction intersecting the optical axis 4), and is controlled by the lens system controller 12. Reference numeral 14 denotes a camera-side image stabilizer (second optical image stabilizer or second optical image stabilizing unit) that drives the image sensor 6 in a plane orthogonal to the optical axis 4 (in the direction intersecting the optical axis 4), and is controlled by the camera system controller 5. Reference numeral 15 denotes a camera-side shake detector provided to the camera body 1 and configured to detect a shake amount of the image pickup apparatus 100. Reference numeral 16 denotes a lens-side shake detector provided to the lens barrel 2 and configured to detect a shake amount of the image pickup apparatus 100.

The image pickup apparatus 100 including the camera body 1 and the lens barrel 2 has an imaging system (imager), an image processing system, a recorder/reproducer system, and a control system. The imaging system includes the imaging optical system 3 and the image sensor 6. The image processing system includes the image processor 7. The recorder/reproducer system includes the memory unit 8 and the display unit 9 (rear display unit 9a and EVF 9b). The control system includes the camera system controller 5, the operation detector 10, the camera-side shake detector 15, the camera-side image stabilizer 14, the lens system controller 12, the lens-side shake detector 16, and the lens-side image stabilizer 13. In addition to the image stabilizing lens 3a, the lens system controller 12 can also drive an unillustrated focus lens, a diaphragm (aperture stop), or the like using an unillustrated driver.

The camera-side shake detector 15 and the lens-side shake detector 16 are, for example, vibration gyros, and can detect a rotational shake amount relative to the optical axis 4 applied to the image pickup apparatus 100, respectively. Based on the rotational shake amount detected by the camera-side shake detector 15 or the lens-side shake detector 16, the camera-side image stabilizer 14 drives the image sensor 6 and the lens-side image stabilizer 13a drives the image stabilizing lens 3a on a plane orthogonal to the optical axis 4, respectively.

The camera-side shake detector 15 includes, for example, an acceleration sensor or the like, and can detect a parallel-movement shake amount (shift shake amount) of the image stabilizing reference position applied to the image pickup apparatus 100. Therefore, the camera-side image stabilizer 14 can drive the image sensor 6 in a plane orthogonal to the optical axis 4 based on the rotational shake amount and the parallel-movement shake amount detected by the camera-side shake detector 15.

The above imaging system is an optical processing system that forms an image of light from an object on the imaging plane of the image sensor 6 via the imaging optical system 3. A signal concerning a focus evaluation amount and a proper exposure amount is obtained from the image sensor 6. Therefore, by properly adjusting the imaging optical system 3 based on this signal, object light having a proper light amount is exposed to the image sensor 6, and an object image is formed near the image sensor 6.

The image processor 7 has an A/D converter, a white balance adjusting circuit, a gamma correcting circuit, an interpolation calculating circuit, and the like, and can generate an image for recording. A color interpolation processor is provided in the image processor 7, and performs color interpolation (demosaicing) processing from the signals of the Bayer array to generate a colored image. The image processor 7 compresses a still image, a motion image, an audio, or the like by using a predetermined method.

The memory unit 8 includes a recorder (memory) for recording the captured image. The camera system controller 5 outputs the captured image to the recorder in the memory unit 8, displays it on the display unit 9, and presents it to the user.

The camera system controller 5 generates and outputs a timing signal or the like during imaging. The camera system controller 5 controls the imaging system, image processing system, and recorder/reproducer system in response to external operations. For example, the operation detector 10 detects a press of the unillustrated shutter release button, and the camera system controller 5 controls driving of the image sensor 6, the operation and the compression processing of the image processor 7, and the like. The camera system controller 5 controls a state of each segment of the information display unit that displays information by the display unit 9. The rear display unit 9a is a touch panel, and may serve as the display unit 9 and the operation unit.

Next follows a description of an adjusting operation of the optical system by the control system. The image processor 7 is connected to the camera system controller 5, and the camera system controller 5 obtains a proper focus position and aperture position (F-number) based on the signal from the image sensor 6. The camera system controller 5 issues a command to the lens system controller 12 via the electrical contact 11. The lens system controller 12 properly controls an unillustrated focus lens driver and diaphragm driver based on the command from the camera system controller 5. In an image stabilizing mode, the camera system controller 5 properly controls the camera-side image stabilizer 14 based on the signal obtained from the camera-side shake detector 15. Similarly, the camera system controller 5 properly controls the lens-side image stabilizer 13 based on the signal obtained from the lens-side shake detector 16.

As a concrete control method, the camera system controller 5 and the lens system controller 12 first detect camera (or manual) shake signals (including the rotational shake (or blur) amount and the parallel-movement shake (or blur) amount) detected by the camera-side shake detector 15 and the lens-side shake detector 16, respectively. Based on the detection results, the camera system controller 5 and the lens system controller 12 calculate driving amounts of the image sensor 6 and the image stabilizing lens 3a for correcting the image blur, respectively. Thereafter, the camera system controller 5 and the lens system controller 12 send, as command values, calculated driving amounts to the camera-side image stabilizer 14 and the lens-side image stabilizer 13, which in turn drive the image sensor 6 and the image stabilizing lens 3a, respectively.

As described above, the camera system controller 5 and the lens system controller 12 controls the operations of each component in the camera body 1 and the lens barrel 2 according to the user operation input to an unillustrated operation member provided on the camera body 1 or the lens barrel 2. Thereby, still image capturing and motion image capturing are available.

Explanation of a State of Image-Forming

Figure 2A:
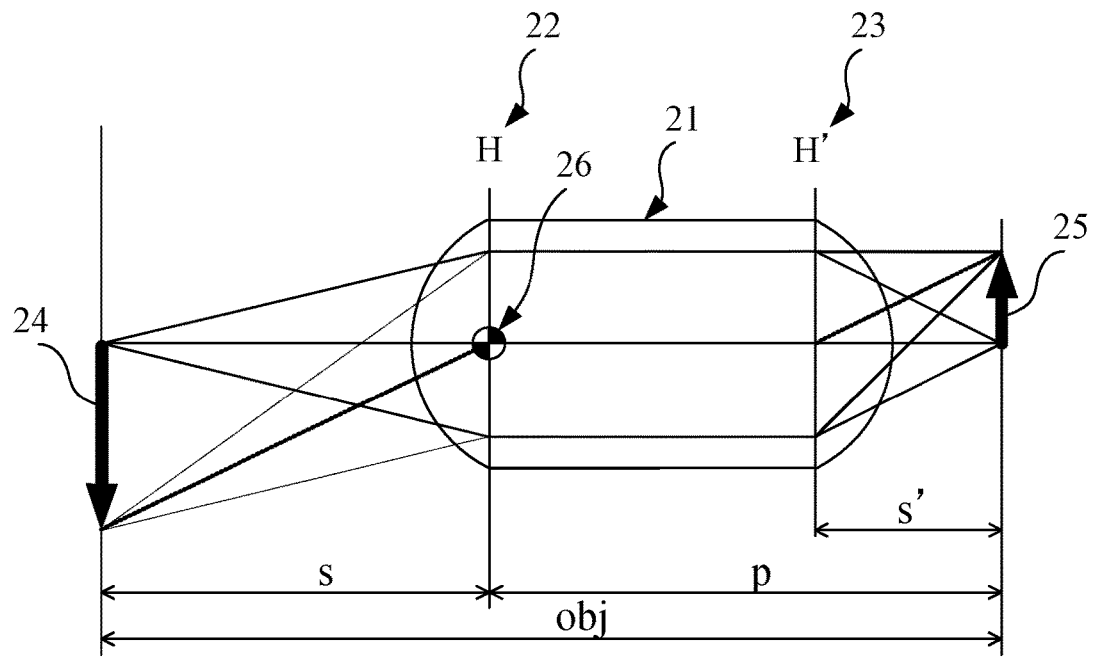
FIGS. 2A and 2B explain a definition of a state of image-forming and an image stabilization when an image stabilizing reference position coincides with a front principal point in this embodiment.
Figure 2B:
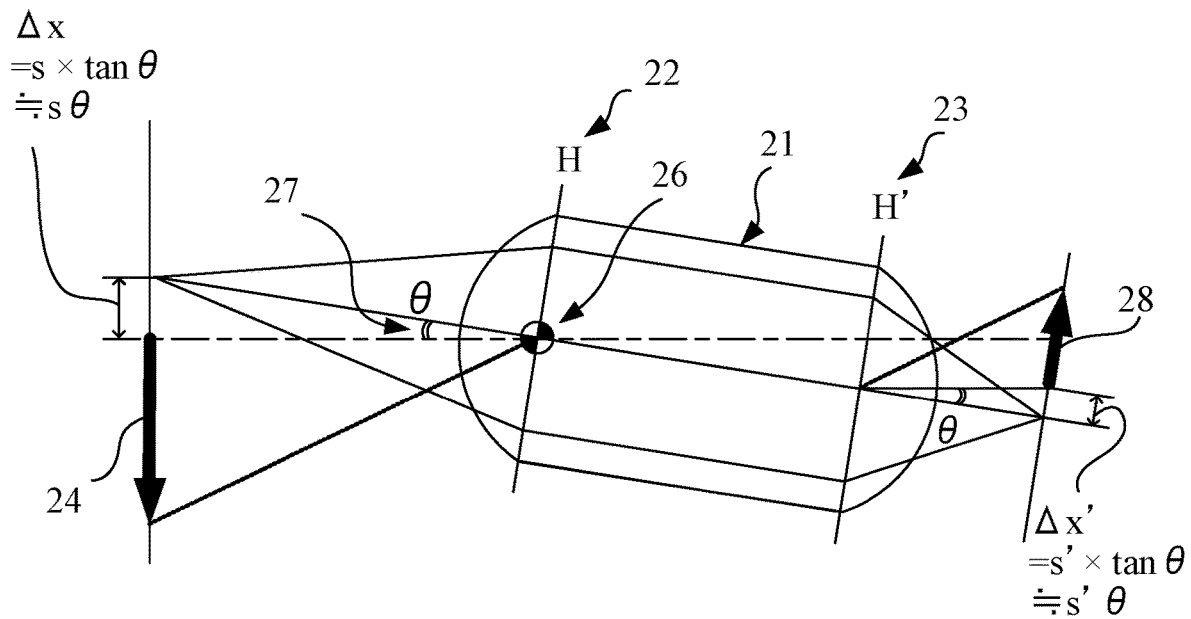

Referring now to FIGS. 2A and 2B, a description will be given of a definition of a state of image-forming (optical path diagram) and an image stabilization when the image stabilizing reference position coincides with the front principal point in this embodiment. FIGS. 2A and 2B explain the definition of the state of image-forming and the image stabilization when the image stabilizing reference position coincides with the front principal point in this embodiment. The image stabilizing reference position is a reference position of the applied shake, in other words, a position that can be regarded as a center of the rotational shake for the image stabilization control. FIG. 2A illustrates a state in which no camera shake is applied to the image pickup apparatus 100 or a stationary state, and FIG. 2B illustrates a state in which camera shake (rotational shake) centered on the front principal point H is applied to the image pickup apparatus 100.

In FIGS. 2A and 2B, reference numeral 21 denotes a thick lens schematically representing the imaging optical system 3, reference numeral 22 denotes a front principal point H of the imaging optical system 3, and reference numeral 23 denotes a rear principal point H' of the imaging optical system 3. Reference numeral 24 denotes an object, and reference numeral 25 denotes an image formed on the image sensor 6. Reference numeral 26 denotes an image stabilizing reference position. FIGS. 2A and 2B illustrate a case where the image stabilizing reference position 26 coincides with the position of the front principal point H. Reference numeral 27 denotes a camera shake (at an angle shake amount θ) applied to the case of FIG. 2B, and reference numeral 28 denotes an image formed on the image sensor 6 in the state of FIG. 2B. For simplicity purposes, s represents a distance from the front principal point H to the object plane (object 24), s' represents a distance from the rear principal point H' to the imaging plane (image 25 formed on the image sensor 6), p represents a distance from the front principal point H to the imaging plane, and obj is a distance from the object plane to the imaging plane.

FIG. 2A illustrates the state in which no camera shake is applied to the image pickup apparatus 100, that is, the stationary state. At this time, the image of the object 24 is formed as the image 25 on the imaging plane at the distance s' from the rear principal point H' in accordance with the law of imaging optics. When the camera shake 27 is applied centering on the front principal point H (=image stabilizing reference position 26), the state of image-forming changes as illustrated in FIG. 2B. A moving amount Δx of the object 24 on the object plane at this time is expressed by the following expression (2-1).

$$\Delta x = s \times \tan\theta \quad (2\text{-}1)$$

Since θ is sufficiently small, the expression (2-1) can be approximately expressed as the following expression (2-2).

$$\Delta x \approx s\theta \quad (2\text{-}2)$$

The image to be captured moves to an image 28 when the image sensor 6 moves, and an image-plane moving amount Δx', which is a moving amount of the image on the imaging plane at this time, is expressed by the following expression (2-3).

$$\Delta x' = s' \times \tan\theta \quad (2\text{-}3)$$

Similar to the expression (2-1), θ is sufficiently small, and thus the expression (2-3) can be approximately expressed as the following expression (24).

$$\Delta x' \approx s'\theta \quad (2\text{-}4)$$

The rotational shake amount θ represented by the shake 27 is detected by the image pickup apparatus 100, as an amount obtained by first-order integration of the gyro sensor provided in the image sensor 6. Therefore, when the image stabilizing reference position 26 coincides with the front principal point H, the amount obtained by multiplying the rotational shake amount θ obtained from the gyro sensor by the distance s' from the rear principal point H' to the imaging plane is calculated as an image stabilizing amount.

Figure 3A:
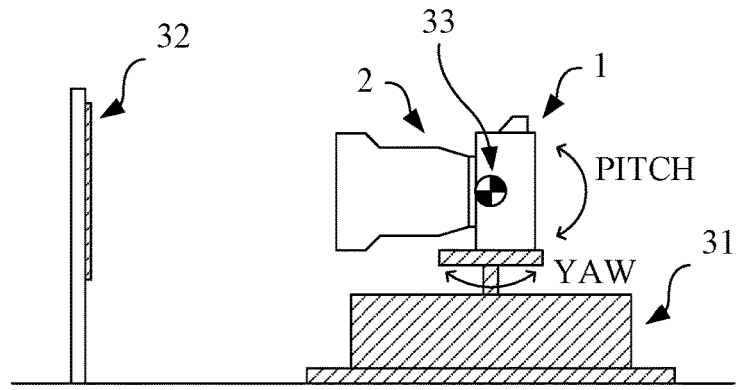
FIGS. 3A and 3B explain an image stabilization when the image stabilizing reference position does not coincide with the front principal point in this embodiment.
Figure 3B:
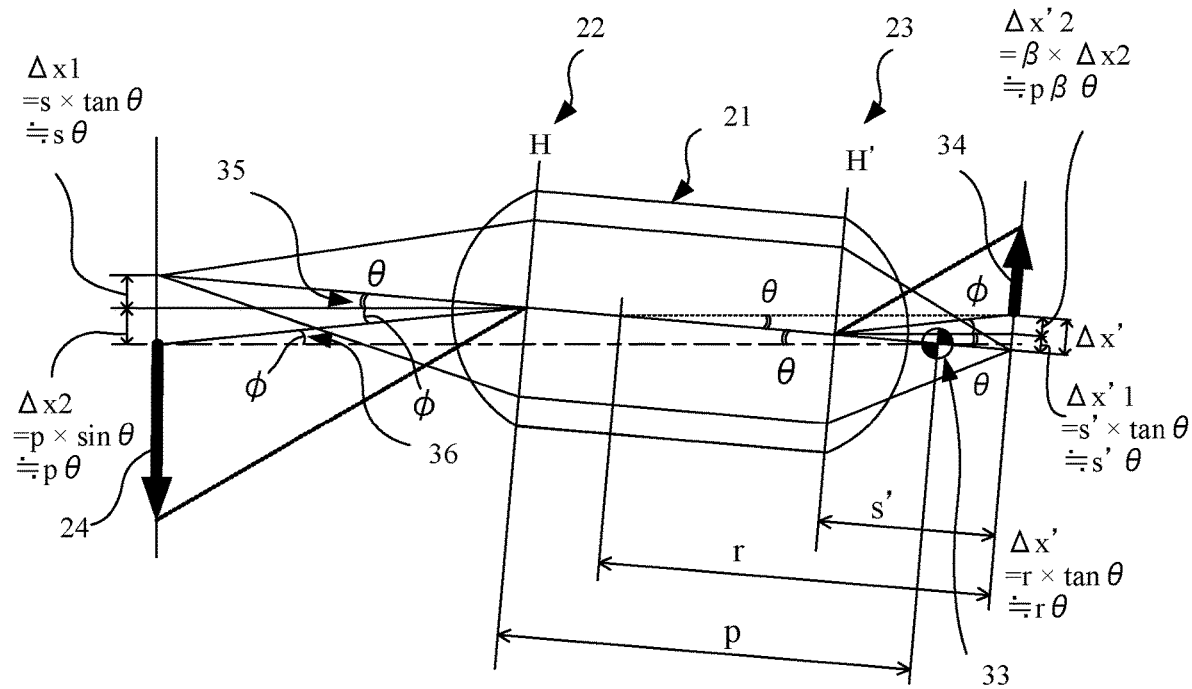

Explanation of a State of Image-Forming when Image Stabilizing Reference Position is not Front Principal Point Referring now to FIGS. 3A and 3B, a description will be given of a state of image-forming when the image stabilizing reference position does not coincide with the front principal point H. FIGS. 3A and 3B explain the image stabilization when the image stabilizing reference position does not coincide with the front principal point H. FIG. 3A is a schematic view of the image stabilizing inspection step in the manufacturing process of the image pickup apparatus 100, and FIG. 3B illustrates a state in which the camera shake (rotational shake amount θ) is applied when the image stabilizing reference position does not coincide with the front principal point H.

In FIGS. 3A and 3B, reference numeral 31 denotes a vibration table used in the inspection step, and reference numeral 32 denotes a chart used for the image stabilizing inspection. Reference numeral 33 denotes a rotation center of the vibration table 31 set when the image pickup apparatus 100 is attached to the vibration table 31, which serves as the image stabilizing reference position in the inspection step of the image pickup apparatus 100. Reference numeral 34 denotes an image on the imaging plane when the camera shake is applied to the image stabilizing reference position 33 as the rotation center, and reference numeral 35 denotes a camera shake (rotational shake amount) applied at that time. Reference numeral 36 denotes an angle representing a moving amount of the image due to the parallel movement of the image stabilizing reference position, which will be described later.

As illustrated in FIG. 3A, the manufacturing process of the image pickup apparatus 100 generally includes the inspection step for inspecting whether the image stabilizing function properly works. This inspection step vibrates the image pickup apparatus in the pitch direction and the yaw direction by the vibration table 31, and inspects that the image captured on the chart 32 at that time is stationary (stabilized) on the image sensor 6.

In this inspection step, the rotation center of the vibration table 31 is maintained constant, whereas the front principal point H of the image pickup apparatus 100 (that is, the camera body 1 and the lens barrel 2) attached to the vibration table 31 generally depends on the product. For example, as illustrated in FIG. 3A, when the image pickup apparatus is fixed at a place such as a tripod seat of the camera body 1, the front principal point H of the lens barrel 2 and the rotation center of the vibration table 31 do not coincide with each other. That is, the front principal point H of the lens barrel 2 does not coincide with the image stabilizing reference position 33. Where the vibration table 31 is driven in such a state and the lens barrel 2 performs the image stabilization such that the captured image of the chart 32 does not move on the imaging plane, the state of image-forming is as illustrated in FIG. 3B.

In FIG. 3B, when a camera shake 35 (angular shake amount θ) is applied with the image stabilizing reference position 33 as the rotation center, the image captured on the image sensor 6 moves to the position of the image 34. Now consider the image plane moving amount Δx' at this time. Initially, the image plane moving amount Δx' is divided into two angles by a straight line parallel to the optical axis 4 as represented by the following expression (3-1).

$$\Delta x'=\Delta x'1+\Delta x'2 \quad (3\text{-}1)$$

Δx'1 is expressed as the expression (3-2) using the angular shake amount θ and the distance s' between the rear principal point H' and the imaging plane similar to the expression (2-2) described with reference to FIGS. 2A and 2B.

$$\Delta x'1 \approx s'\theta \quad (3\text{-}2)$$

Next, consider Δx'2. Δx'2 is the image plane moving amount caused by the parallel movement of the front principal point H, and can be expressed using an angle φ. The angle φ cannot be detected by a gyro sensor or the like provided in the image pickup apparatus. When the distance p from the front principal point H to the image stabilizing reference position 33 is used, the image plane moving amount Δx2 due to the parallel movement of the front principal point H on the object plane is calculated by the following expression (3-3).

$$\Delta x2=p\times\sin\theta \quad (3\text{-}3)$$

As previously discussed, θ is sufficiently small, and thus the expression (3-3) can be approximately expressed as the following expression (3-4).

$$\Delta x2 \approx p\theta \quad (3\text{-}4)$$

Here, the following expression (3-5) is established using the image magnification β (β=s'/s).

$$\Delta x'2=\beta\times\Delta x2 \quad (3\text{-}5)$$

Therefore, the following expression (3-6) is established by substituting the expression (3-4) for the expression (3-5) and by transforming the result.

$$\Delta x'2=p\beta\theta \quad (3\text{-}6)$$

In this way, Δx'2 can be expressed as in the expression (3-6) using the distance p from the front principal point H to the image stabilizing reference position 33 and the angle θ that is detectable by the gyro sensor. Therefore, when the expression (3-2) and the expression (3-6) are substituted for the expression (3-1) and transformed, the image plane moving amount Δx' can be expressed as the following expression (3-7).

$$\Delta x'=s'\theta+p\beta\theta=(s'+p\beta)\theta \quad (3\text{-}7)$$

Here, the following expression (3-8) is established.

$$r=s'+p\beta \quad (3\text{-}8)$$

The expression (3-7) can be transformed into the following expression (3-9) using the expression (3-8).

$$\Delta x'=r\theta \quad (3\text{-}9)$$

r in expression (3-8) can be expressed as r drawn in FIG. 3B. Now consider the image plane moving amount Δx' when the image stabilizing reference position 33 does not coincide with the front principal point H. As understood from a comparison between the expression (2-2) and the expression (3-9), the image plane moving amount Δx' in this case can be calculated by multiplying the angular shake amount θ obtained from the gyro sensor by r, instead of the distance s' from the imaging plane to the rear principal point H' according to the expression (2-2). Hereinafter, r in the expression (3-8) will be referred to as an inspecting radius of gyration.

When the inspecting radius of gyration r is used in this way, the image stabilization can be accurately performed during the inspection by using only the signal of the gyro sensor provided in the image pickup apparatus 100. Therefore, the lens barrel 2 that corrects only the rotational shake can provide an accurate image stabilization using the above method. That is, a large lens barrel 2 can provide the accurate image stabilization using the inspecting radius of gyration r, even if the image stabilizing reference position 33 does not coincide with the front principal point H.

On the other hand, an image stabilizing mechanism that can correct the parallel-movement shake in addition to the rotational shake is also known. Although details of a method for detecting the parallel-movement shake will be omitted, a common method calculates the rotation position of the parallel-movement shake using the outputs of the gyro sensor and the acceleration sensor. That is, it is a method of calculating the distance p from the image stabilizing reference position 33 to the front principal point H using the gyro sensor and the acceleration sensor.

When the parallel-movement shake can be detected with the acceleration sensor and the gyro sensor in this way, Δx'1 and Δx'2 in FIG. 3B can be independently calculated. That is, the camera body 1 and the lens barrel 2 designed to correct the parallel-movement shake can independently calculate Δx'1 and Δx'2, and provide an accurate image stabilization even when the image stabilizing reference position 33 does not coincide with the front principal point H.

Explanation of Image Stabilization when Image Stabilizing Reference Position does not Coincide with Front Principal Point Now consider use of the lens barrel 2 that corrects only the rotational shake and the camera body 1 that corrects both the rotational shake and the parallel-movement shake in combination. It is generally for the image pickup apparatus 100 in which the camera body 1 and the lens barrel 2 each include an image stabilizer, to divide the detected shake amount into a share for the image stabilizer in the camera body 1 and a share for the image stabilizer in the lens barrel 2 and to provide an image stabilization at each image stabilizer. Therefore, the image plane moving amount Δx'=rθ calculated in the lens barrel 2 and the image plane moving amount Δx'=s'θ+pβθ calculated in the camera body 1 are distributed in a certain ratio for the image stabilization.

However, the inspecting radius of gyration r used in the lens barrel 2 is unique depending on the type of the lens barrel 2. Therefore, depending on the combination of the lens barrel 2 and the camera body 1, the accurate correction may be unavailable if the shake corrections are made by distributing both image stabilizing amounts in the ratio. Accordingly, in this embodiment, the camera body 1 monitors the image stabilizing amount of the lens barrel 2, and corrects the image stabilizing amount in the camera body 1 so as to provide the accurate image stabilization, when the image stabilizer is provided to each of the camera body 1 and the lens barrel 2.

First, the camera system controller 5 obtains, from the lens system controller 12 through a communication with it using the electrical contact 11, information on the inspecting radius of gyration r of the lens barrel 2, the image magnification β, and the distance s' from the imaging plane to the rear principal point H'. Then, using the expression (3-8), the distance p from the front principal point H to the image stabilizing reference position 33 is calculated as in the following expression (3-10).

$$p=(r-s')/\beta \quad (3\text{-}10)$$

Using the distance p from the front principal point H to the image stabilizing reference position 33, the image plane moving amount Δx'2 due to the parallel movement of the front principal point H to be corrected in the lens barrel 2 is calculated as in the following expression (3-11) using the expression (3-6).

$$\Delta x'2=(r-s')\theta \quad (3\text{-}11)$$

In this way, when the image stabilizing amount rθ is corrected in the lens barrel 2, the camera body 1 can obtain the itemization. Therefore, it can calculate each of the rotational shake correcting amount Δx'1 corrected by the lens barrel 2 and the shake amount Δx'2 caused by the parallel movement of the image stabilizing reference position.

Next follows a description of the way of calculating the image stabilizing amount in the actual image stabilization. The actual camera shake contains the rotational shake and the parallel-movement shake, and the rotational shake amount can be calculated based on the output of the gyro sensor. On the other hand, as described above, it is common to acquire the parallel movement shake amount using a method of calculating the rotation position of the parallel-movement shake from the output of the acceleration sensor and the output of the gyro sensor. However, the rotation position of the parallel-movement shake calculated based on the actually applied camera shake does not always coincide with the image stabilizing reference position 33 used during the inspection.

Therefore, in the image stabilization that uses a combination of the camera body 1 that corrects the rotational shake and the parallel-movement shake and the lens barrel 2 that corrects only the rotational shake, the image stabilizer provided in the lens barrel 2 may have an error in the image stabilizing amount. That is, the shake correction amount for the parallel-movement shake differs only by a difference between the image stabilizing reference position 33 during the inspection and the actual rotation position of the parallel-movement shake.

Accordingly, as expressed by the expression (3-11), the camera body 1 calculates the parallel-movement shake during the inspection, which is added to the shake correction amount in the lens barrel 2, and calculates the parallel-movement shake relative to the actual camera shake based on the result. At this time, the camera body 1 calculates a driving amount of the camera-side image stabilizer 14 based on information on the image stabilizing reference position (inspecting radius of gyration r), information on the rear principal point (distance s' from the rear principal point H' to the imaging plane), and information of the image magnification (image magnification β=s'/s), which are obtained from the lens barrel 2.

Here, the information on the image stabilizing reference position corresponds to the inspecting radius of gyration r in the lens barrel 2, and the information on the rear principal point corresponds to the distance s' from the rear principal point H' in the lens barrel 2 to the imaging plane. The information of the image magnification corresponds to the image magnification β in the lens barrel 2. The information on the image stabilizing reference position, the rear principal point, and the image magnification changes depending on the focal length, the focus state (focus lens position), etc., and a method of receiving each information from the lens barrel 2 by the camera body 1 is not limited, such as a method of communicating and simultaneously acquiring information on each focal length and focus state when the power is turned on, and a method of communicating and acquiring each information whenever image stabilizing driving is to be made.

As described above, using each information, the camera body 1 can calculate the parallel-movement shake during the inspection that has been added to the image stabilizing amount (shake correction amount) in the lens barrel 2, take the result into account, and calculate the parallel-movement shake relative to the actual camera shake. Therefore, even when the camera body 1 that corrects the rotational shake and the parallel-movement shake and the lens barrel 2 that corrects only the rotational shake are combined so as to perform the image stabilization, the image stabilization can be performed with high accuracy.

Explanation of Image Stabilizing Method

Figure 4:
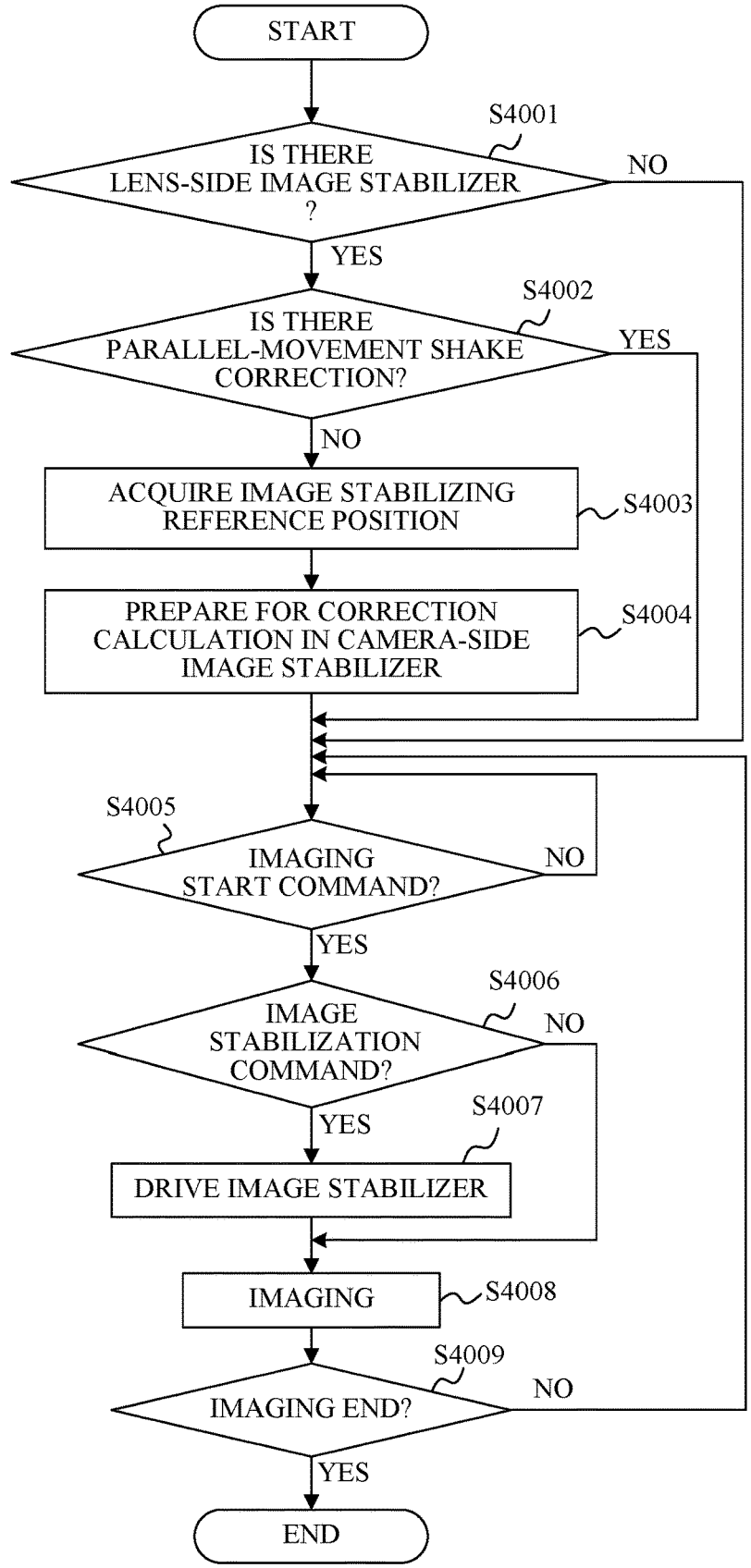
FIG. 4 is a flowchart of an image stabilizing method according to this embodiment.

Referring now to FIG. 4, a description will be given of the image stabilizing method (control method) according to this embodiment. FIG. 4 is a flowchart of the image stabilizing method according to this embodiment. The flowchart in FIG. 4 starts when the image pickup apparatus 100 is powered on.

First, in the step S4001, the camera system controller 5 communicates with the lens system controller 12 via the electrical contact 11, and determines whether or not the lens barrel 2 has the lens-side image stabilizer 13. If the lens-side image stabilizer 13 is provided, the flow proceeds to the step S4002. On the other hand, if there is no lens-side image stabilizer 13, the flow proceeds to the step S4005. Alternatively, the lens model number may be acquired through the communication, and it may be determined whether or not the lens barrel 2 includes the lens-side image stabilizer 13 based on the lens model number.

In the step S4002, the camera system controller 5 communicates with the lens system controller 12 via the electrical contact 11, and determines whether the lens-side image stabilizer 13 provided in the lens barrel 2 has corrected the parallel-movement shake. If the lens-side image stabilizer 13 has not corrected the parallel-movement shake, the flow proceeds to the step S4003. On the other hand, if the lens-side image stabilizer 13 has corrected the parallel-movement shake, the flow proceeds to the step S4005.

Whether or not the lens-side image stabilizer 13 corrects the parallel-movement shake in the step S4002 can be determined based on, for example but not limited to, information on whether or not an acceleration sensor exists or information on the model of the lens barrel 2. As illustrated in FIG. 3A, any methods may be used as long as the image stabilizing reference position 33 does not coincide with the front principal point H and it can be determined whether or not the image stabilization is performed using the inspecting radius of gyration r. When the parallel-movement shake is corrected in the lens barrel 2, the image stabilizing reference position in the lens barrel 2 basically coincides with the front principal point H of the lens barrel 2. Therefore, as described with reference to FIGS. 3A and 3B, the camera body 1 can perform the image stabilization with high accuracy without correcting the driving amount of the lens-side image stabilizer 13.

In the step S4003, the camera system controller (acquiring unit) 5 acquires information on the image stabilizing reference position from the lens system controller 12. The information on the image stabilizing reference position acquired by the camera system controller 5 in the step S4003 includes, but is not limited to, the inspecting radius of gyration r, the image magnification β, and the distance s' from the imaging plane to the rear principal point H' explained with reference to FIGS. 3A and 3B. The information on the image stabilizing reference position may be acquired in the step S4003 at once for all of the zoom and focus states of the lens barrel 2, or whenever the lens barrel 2 is operated and each of the zoom and focus states is changed.

Next, in the step S4004, the camera system controller 5 prepares for the calculation of the image stabilizing amount to be corrected by the camera-side image stabilizer 14. More specifically, as described in the expression (3-11), the camera system controller 5 performs the calculation preparation that calculates the shake amount which is added as the image stabilizing amount in the lens barrel 2, and is caused by the parallel movement of the front principal point H during the inspection, and subtracts it from the parallel-movement shake so as to correct the actual camera shake.

In the step S4005, the camera system controller 5 determines whether or not an imaging start command (so-called shutter release button pressing S2) has been input by the user. When the imaging start command is input, the flow proceeds to the step S4006. If the imaging start command is not input, the step S4005 is repeated (stands by).

In the step S4006, the camera system controller 5 determines whether or not the user has instructed the image stabilization (or turned on or off the image stabilizing setting). When the image stabilization is required, the flow proceeds to the step S4007. On the other hand, if the image stabilization is not required, the flow proceeds to the step S4008.

In the step S4007, the camera system controller 5 drives the lens-side image stabilizer 13 and the camera-side image stabilizer 14 together with the lens system controller 12, respectively, and performs the image stabilization. More specifically, the camera-side image stabilizer 14 calculates a shake amount caused by the parallel movement of the front principal point H during the inspection, which is to be corrected by driving the lens-side image stabilizer 13. Then, the camera-side image stabilizer 14 corrects the entire parallel-movement shake of the image pickup apparatus 100 by taking into account the shake amount corresponding to that amount.

Next, in the step S4008, the camera system controller 5 captures an image under the set imaging condition. During imaging in the step S4008, the lens-side image stabilizer 13 and the camera-side image stabilizer 14 continue to be driven. Next, in the step S4009, the camera system controller 5 determines whether or not to the imaging is to end based on the input of the user or the like. When the imaging is to end, this flow ends. On the other hand, if the imaging is not to end, the flow returns to the step S4005.

In the step S4004 in this embodiment, the camera body 1 subtracts the parallel-movement shake amount by the camera-side image stabilizer 14 from the parallel-movement shake amount corrected by the lens barrel 2, so as to apparently change the image stabilizing reference position of the camera-side image stabilizer 14. That is, the image stabilizing reference position of the camera-side image stabilizer 14 when the lens system controller 12 and the camera system controller 5 control the lens-side image stabilizer 13 and the camera-side image stabilizer 14 is different from the image stabilizing reference position when only the camera-side image stabilizer 14 is controlled. Now assume that a first image stabilizing reference position is an image stabilizing reference position of the camera-side image stabilizer 14 when the lens system controller 12 and the camera system controller 5 control the lens-side image stabilizer 13 and the camera-side image stabilizer 14. That is, the first image stabilizing reference position is different from a (second) image stabilizing reference position when the lens system controller 12 does not control the lens-side image stabilizer 13 and the camera system controller 5 controls the camera-side image stabilizer 14. The case where the lens system controller 12 does not control the lens-side image stabilizer 13 includes a case where the lens barrel has no lens-side image stabilizer 13.

As described above, in this embodiment, the camera body 1 is an image pickup apparatus attachable to and detachable from the lens barrel 2 that includes the lens-side image stabilizer 13 for moving the image stabilizing lens 3a, which is a part of the imaging optical system 3, in a direction intersecting the optical axis 4 of the imaging optical system 3. The camera system controller 5 controls the camera-side image stabilizer 14 based on the image stabilizing reference position of the lens-side image stabilizer 13. The camera system controller 5 may control the camera-side image stabilizer 14 further based on information of the rear principal point position, and the image magnification. The camera body 1 may include an acquiring unit (camera system controller 5) for acquiring information on the image stabilizing reference position of the lens-side image stabilizer 13 by communicating with the lens barrel 2.

In this embodiment, the acquiring unit (camera system controller 5) may acquire information on whether or not the mounted lens barrel 2 includes the lens-side image stabilizer 13 that moves the image stabilizing lens 3a in the direction intersecting the optical axis 4 by communicating with the lens barrel 2. The controller (camera system controller 5) may change the image stabilizing reference position of the camera-side image stabilizer 14 between when the mounted lens barrel 2 includes the lens-side image stabilizer 13 and when the mounted lens barrel 2 does not include the lens-side image stabilizer 13. When the lens barrel 2 includes the lens-side image stabilizer 13, the acquiring unit may acquire information on the image stabilizing reference position of the lens-side image stabilizer 13. Then, the controller may control the camera-side image stabilizer 14 based on the image stabilizing reference position of the lens-side image stabilizer 13 acquired by the acquiring unit.

The information on the image stabilizing reference position may include at least one of information on the image stabilizing reference position and information on the model of the lens barrel 2 acquired by the acquiring unit. The image stabilizing reference position may be a rotation center position of the shake applied to the image pickup apparatus 100. The camera system controller 5 may control the camera-side image stabilizer 14 so as to reduce the parallel-movement shake amount caused by moving the optical element by the lens-side image stabilizer 13.

This embodiment can suppress a decrease in image stabilization performance, even when the lens barrel 2 including the lens-side image stabilizer 13 having the image stabilizing reference position different from the front principal point is used in combination with the camera-side image stabilizer 14 of the camera body 1.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This embodiment can suppress a decrease in image stabilization performance, even if the lens barrel including the image stabilizer having the image stabilizing reference position different from the front principal point is used in combination with the image stabilizer in the camera body. Therefore, this embodiment can provide an image pickup apparatus, a control method, and a storage medium, each of which can suppress a decrease in image stabilizing performance during cooperative control of the image stabilizer in the lens barrel and the image stabilizer in the camera body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-061810, filed on Mar. 31, 2020 which is hereby incorporated by reference herein in its entirety.

What is claimed is:

1. An image pickup apparatus mountable with a lens apparatus including a first optical image stabilizing unit configured to move an optical element that is a part of the imaging optical system, in a direction intersecting an optical axis of the imaging optical system, the image pickup apparatus comprising:
an image sensor;
at least one processor; and
at least one memory coupled to the at least one processor storing instructions that, when executed by the at least one processor, cause the at least one processor to function as a second optical image stabilizing unit and a control unit,
wherein the second optical image stabilizing unit moves the image sensor in a direction intersecting the optical axis, and
wherein the control unit changes control of the second optical image stabilizing unit based on a distance in an optical axis direction from a front principal point to an image stabilizing reference position of the first optical image stabilizing unit which is a reference position for an image stabilization of the first optical image stabilizing unit.

2. The image pickup apparatus according to claim 1, wherein the control unit controls the second optical image stabilizing unit further based on information on a rear principal point position and an image magnification.

3. The image pickup apparatus according to claim 1, wherein the instructions cause the at least one processor to function as an acquiring unit, and the acquiring unit acquires information on the image stabilizing reference position of the first optical image stabilizing unit by communicating with the lens apparatus.

4. The image pickup apparatus according to claim 3, wherein the information on the image stabilizing reference position includes at least one of information of the image stabilizing reference position and information on a model of the lens apparatus.

5. The image pickup apparatus according to claim 1, wherein the image stabilizing reference position is a rotation center position of a shake applied to the image pickup apparatus.

6. The image pickup apparatus according to claim 1, wherein the control unit controls the second optical image stabilizing unit so as to reduce a parallel-movement shake amount of the image stabilizing reference position caused by moving the optical element by the first optical image stabilizing unit.

7. An image pickup apparatus mountable with each of a lens apparatus that includes a first optical image stabilizing unit configured to move an optical element that is a part of the imaging optical system, in a direction intersecting an optical axis of the imaging optical system, and a lens apparatus that does not include the first optical image stabilizing unit, the image pickup apparatus comprising:
an image sensor;
at least one processor; and
at least one memory coupled to the at least one processor storing instructions that, when executed by the at least one processor, cause the at least one processor to function as a second optical image stabilizing unit, a control unit, and an acquiring unit, wherein the second optical image stabilizing unit moves the image sensor in a direction intersecting the optical axis of the imaging optical system, wherein the control unit controls the second optical image stabilizing unit, wherein the acquiring unit acquires information on whether or not the lens apparatus includes the first optical image stabilizing unit by communicating with the lens apparatus, and wherein the control unit changes a distance in an optical axis direction from a front principal point to an image stabilizing reference position of the second optical image stabilizing unit which is a reference position for an image stabilization of the second optical image stabilizing unit, between when the lens apparatus includes the first optical image stabilizing unit and when the lens apparatus does not include the first optical image stabilizing unit.

8. The image pickup apparatus according to claim 7, wherein when the lens apparatus includes the first optical image stabilizing unit, the acquiring unit acquires information on an image stabilizing reference position of the first optical image stabilizing unit which is a reference position for an image stabilization of the first optical image stabilizing unit, and the control unit controls the second optical image stabilizing unit based on the image stabilizing reference position of the first optical image stabilizing unit acquired by the acquiring unit.

9. The image pickup apparatus according to claim 8, wherein the information on the image stabilizing reference position includes at least one of information of the image stabilizing reference position and information on a model of the lens apparatus acquired by the acquiring unit.

10. The image pickup apparatus according to claim 7, wherein the image stabilizing reference position is a rotation center position of a shake applied to the image pickup apparatus.

11. The image pickup apparatus according to claim 7, wherein the control unit controls the second optical image stabilizing unit so as to reduce a parallel movement shake amount of the image stabilizing reference position caused by moving the optical element by the first optical image stabilizing unit.

12. A control method comprising:
a first control step for moving an optical element that is a part of an imaging optical system, in a direction intersecting an optical axis of the imaging optical system using a first optical image stabilizing unit; and
a second control step for moving an image sensor in a direction intersecting the optical axis using a second optical image stabilizing unit,
wherein the second control step changes controls control of the second optical image stabilizing unit based on a distance in an optical axis direction from a front principal point to an image stabilizing reference position of the first optical image stabilizing unit which is a reference position for an image stabilization of the first optical image stabilizing unit.

13. A control method comprising the steps of:
acquiring, by communicating with a lens apparatus, information on whether or not the lens apparatus includes a first optical image stabilizing unit configured to move an optical element that is a part of an imaging optical system, in a direction intersecting an optical axis of the imaging optical system; and
changing a distance in an optical axis direction from a front principal point to an image stabilizing reference position of the second optical image stabilizing unit configured to move an image sensor in a direction intersecting the optical axis, which is a reference position for an image stabilization of the second optical image stabilizing unit, between when the lens apparatus includes the first optical image stabilizing unit and when the lens apparatus does not include the first optical image stabilizing unit.

14. A non-transitory computer-readable storage medium storing a computer program that causes a computer to execute a control method according to claim 12.

15. A non-transitory computer-readable storage medium storing a computer program that causes a computer to execute a control method according to claim 13.

* * * * *